United States Patent
High et al.

(10) Patent No.: US 10,254,766 B2
(45) Date of Patent: Apr. 9, 2019

(54) AUTONOMOUS GANGED VEHICLES

(71) Applicant: Walmart Apollo, LLC, Bentonville, AR (US)

(72) Inventors: Donald R. High, Noel, MO (US); David C. Winkle, Bella Vista, AR (US); Michael D. Atchley, Springdale, AR (US); Brian G. McHale, Chadderton Oldham (GB); Nicholas Ray Antel, Winona, MO (US); John J. O'Brien, Farmington, AR (US); Todd D. Mattingly, Bentonville, AR (US); Nathan G. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/708,686

(22) Filed: Sep. 19, 2017

(65) Prior Publication Data
US 2018/0129223 A1 May 10, 2018

Related U.S. Application Data

(60) Provisional application No. 62/419,574, filed on Nov. 9, 2016.

(51) Int. Cl.
*G05D 1/02* (2006.01)
*G05D 1/00* (2006.01)
*B64C 1/20* (2006.01)

(52) U.S. Cl.
CPC ......... *G05D 1/0295* (2013.01); *G05D 1/0022* (2013.01); *G05D 1/0027* (2013.01);
(Continued)

(58) Field of Classification Search
CPC .. G05D 1/0295; G05D 1/0022; G05D 1/0027; B64C 1/20; B64C 27/26; B64C 39/00; G08G 1/164
(Continued)

(56) References Cited

U.S. PATENT DOCUMENTS 8,288,989 B2    10/2012  Baba
8,326,473 B2    12/2012  Simpson
(Continued)

FOREIGN PATENT DOCUMENTS

WO    2015051436    4/2015

OTHER PUBLICATIONS

PCT; App. No. PCT/US2017/059654; International Search Report and Written Opinion dated Jan. 9, 2018.
(Continued)

*Primary Examiner* — Tan Q Nguyen
(74) *Attorney, Agent, or Firm* — Fitch, Even, Tabin & Flannery LLP

(57) ABSTRACT

Some embodiments include systems, methods, and apparatuses capable of determining a leader of a group of autonomous vehicles. In some embodiments, a system of autonomous vehicles comprises two or more autonomous vehicles each having a communication device and in communication with one another, each of the two or more autonomous vehicles configured to travel as a group, receive and transport goods, communicate with others of the two or more autonomous vehicles in the group, and conduct a negotiation to establish at least one leader, wherein any one of the two or more autonomous vehicles can become the at least one leader.

20 Claims, 3 Drawing Sheets

(52) U.S. Cl.
CPC ......... *G05D 1/0202* (2013.01); *G05D 1/0206* (2013.01); *G05D 1/0212* (2013.01); *G05D 2201/0201* (2013.01)

(58) Field of Classification Search
USPC ........................................................ 701/1, 2
See application file for complete search history.

(56) References Cited

U.S. PATENT DOCUMENTS

| | | | |
|---|---|---|---|
| 8,510,029 | B2 | 8/2013 | Curtis |
| 8,855,835 | B2 | 10/2014 | Kumabe |
| 8,912,687 | B2 | 12/2014 | Kesler |
| 8,947,531 | B2 | 2/2015 | Fischer |
| 9,020,636 | B2 | 4/2015 | Tadayon |
| 9,043,052 | B2 | 5/2015 | So |
| 9,141,112 | B1 * | 9/2015 | Loo ...................... G05D 1/0293 |
| 9,230,236 | B2 | 1/2016 | Villamar |
| 9,550,577 | B1 | 1/2017 | Beckman |
| 9,573,684 | B2 | 2/2017 | Kimchi |
| 2009/0294573 | A1 | 12/2009 | Wilson |
| 2014/0107867 | A1 * | 4/2014 | Yamashiro ............... G08G 1/22 701/2 |
| 2015/0120094 | A1 | 4/2015 | Kimchi |
| 2015/0127189 | A1 * | 5/2015 | Mehr .................. B60W 30/165 701/1 |
| 2015/0277440 | A1 | 10/2015 | Kimchi |
| 2016/0146619 | A1 * | 5/2016 | Song ...................... G01C 21/34 701/537 |
| 2016/0196755 | A1 | 7/2016 | Navot |
| 2016/0209849 | A1 | 7/2016 | Arbogast |
| 2016/0257401 | A1 | 9/2016 | Buchmueller |
| 2017/0110017 | A1 | 4/2017 | Kimchi |

OTHER PUBLICATIONS

"What is Sidewalk ?"; Superum; published 2015; pp. 1-10.
Ackerman, Evan; "UAV Concept: Mother Hen and Friendly Chicks"; IEEE Spectrum; http://spectrum.ieee.org/automaton/robotics/drones/uavconceptmotherhenandfriendlychicks; published Oct. 8, 2013; pp. 1-3.
Siciliano, Bruno, et al.; "Springer Handbook of Robotics"; Springer, Berlin, Heidelberg; published in 2008; p. 929.

* cited by examiner

AUTONOMOUS GANGED VEHICLES

CROSS-REFERENCE TO RELATED APPLICATION

This application claims the benefit of U.S. Provisional Application No. 62/419,574, filed Nov. 9, 2016, which is incorporated herein by reference in its entirety.

TECHNICAL FIELD

This invention relates generally to vehicles and, more particularly, to autonomous vehicles.

BACKGROUND

Whether transporting goods or materials from a supplier to a manufacturer, warehouse to a retailer, retailer or warehouse to a residence or business, the transportation of goods and materials constitutes a not insignificant portion of the cost of the goods and materials. One of the contributing factors to the cost of transporting goods and materials is paying employees to drive or pilot transportation vehicles. Additionally, transporting goods and materials, whether by land, air, or sea, increase traffic on the roads, airways, and waterways, respectively. Utilizing autonomous vehicles to transport goods and services can help alleviate these problems. However, many difficulties must be overcome before autonomous vehicles can be used to transport goods and materials.

BRIEF DESCRIPTION OF THE DRAWINGS

Disclosed herein are embodiments of systems, apparatuses, and methods pertaining to autonomous vehicles. This description includes drawings, wherein.

Figure 1A:
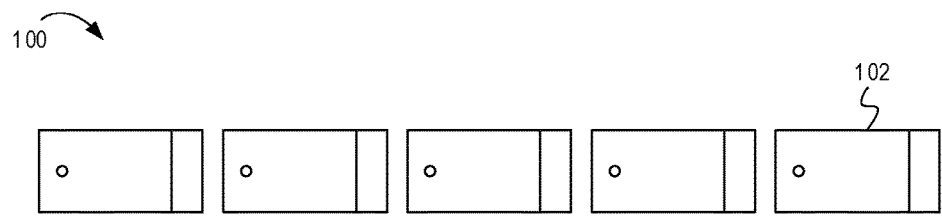
FIGS. 1A-1B depict groups of autonomous vehicles, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to determining a leader for a group of autonomous vehicles. In some embodiments, a system comprises two or more autonomous vehicles each having a communication device and in communication with one another, each of the two or more autonomous vehicles configured to travel as a group, receive and transport goods, communicate with others of the two or more autonomous vehicles in the group, and conduct a negotiation to establish at least one leader, wherein any one of the two or more autonomous vehicles can become the at least one leader.

As previously discussed, autonomous vehicles can be used to decrease the costs of transporting goods and materials. Additionally, the use of autonomous vehicles can reduce traffic. Large vehicles (e.g., semi-trailer trucks) are useful when delivering large quantities of materials and goods to a single destination. For example, if a large quantity of materials and/or goods is to be delivered from San Francisco to Washington, D.C., it may be beneficial for a single vehicle to transport the entire quantity of materials and/or goods all the way from San Francisco to Washington, D.C. However, if a first portion of the materials and/or goods is to be delivered to Dallas, a second portion of the materials and/or goods is to be delivered to Minneapolis, and a third portion of the materials and/or goods is to be delivered to Washington, D.C., it may no longer be efficient to have a single large vehicle deliver all the goods (i.e., it may not be efficient to have a single large vehicle travel from San Francisco to Dallas, Dallas to Minneapolis, and finally from Minneapolis to Washington, D.C.). Rather, it may be more efficient to have a first vehicle transport the first portion of the materials and/or goods from San Francisco to Dallas, a second vehicle transport the second portion of the materials and/or goods from San Francisco to Minneapolis, and a third vehicle transport the third portion of the materials and/or goods from San Francisco to Washington, D.C. Further, because some of the San Francisco to Dallas, San Francisco to Minneapolis, and San Francisco to Washington, D.C. trips would be common to each of the three vehicles, it may be even more efficient yet if the three vehicles traveled as a group (e.g., in a convoy) during part of the trip. While traveling as a group, the first vehicle can separate from the group at a junction appropriate for the first vehicle to travel to Dallas and the second vehicle can separate from the group at a junction appropriate for the second vehicle to travel to Minneapolis. Embodiments described herein provide systems, apparatuses, and methods that allow autonomous vehicles to travel as a group, when appropriate, and separate, as individual vehicles or smaller groups, when appropriate. The discussion of FIGS. 1A-1B provides a general overview of autonomous vehicles traveling in groups.

Figure 1B:
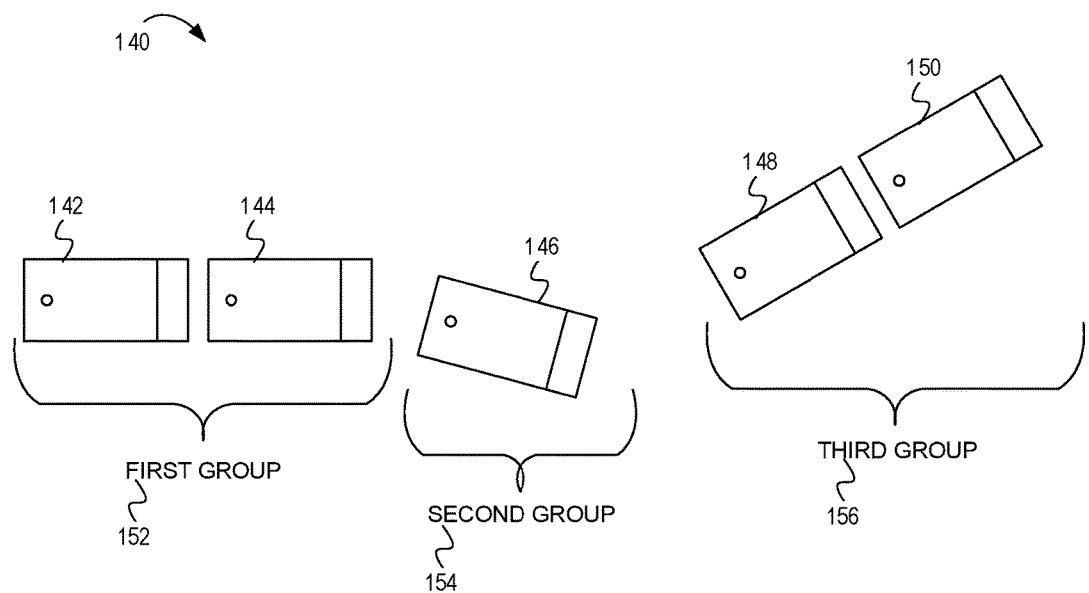

FIG. 1A is an overhead view of a group 100 of autonomous vehicles 102. The autonomous vehicles 102 can be land-based, air-based (i.e., aerial), water-based, or any combination of the three. In some embodiments, the autonomous vehicles 102 in the group 100 are physically connected to one another (e.g., via a hitch and ball mechanism). In other embodiments, the autonomous vehicles 102 in the first group are not physically attached to one another, but rather follow one another (e.g., based on commands received, monitoring movements of an autonomous vehicle 102 in front, etc.).

The autonomous vehicles 102 in the group 100 communicate with one another to determine routes, capabilities of other autonomous vehicles 102 (e.g., within the group 100 and other groups), cargo of other autonomous vehicles 102 (e.g., within the group 100 and other groups), destinations, etc. The autonomous vehicles 102 can also communicate with other recipients (e.g., non-autonomous vehicle recipients), such as computer systems associated with retailers, distributors, government agencies (e.g., a weather service, traffic service, or regulatory body), traditional vehicles, etc. One aspect of these communications is determining a leader of the group 100. The leader of the group 100 can dictate a route, organize power sharing between the autonomous vehicles, provide information to the autonomous vehicles, and generally control operation of the autonomous vehicles 102 in the group 100. Additionally, the leader of the group 100 can assess the other autonomous vehicles 102 in the group for task optimization and assignment. For example, the leader can assign tasks to others of the autonomous vehicles 102 in the group 100 so that the group 100 can complete goals more efficiently, quickly, etc.

In some embodiments, the autonomous vehicles 102 in the group 100 conduct a negotiation amongst themselves to determine which autonomous vehicle 102 in the group 100 will be the leader. The leader can be determined based on any suitable factor. For example, determination of the leader can be based on qualities associated with each of the autonomous vehicles 102 (e.g., types of sensors included on each autonomous vehicle 102), power level of each autonomous vehicle 102 (fuel level, battery level, etc.), cargo of the autonomous vehicles 102, destinations of the autonomous vehicles 102, a collective goal of the group 100, external factors (e.g., weather conditions, route conditions or type, etc.), position within the group 100 (e.g., the first autonomous vehicle 102 in the group 100), etc. In further embodiments, a leader for the group 100 can also be determined based on information or commands received from the other recipients. Once the negotiation is complete and the leader is selected, the leader can control operation of the group 100.

While the first autonomous vehicle 102 in the group 100 can be the leader, it is not necessary the first autonomous vehicle 102 in the group 100 be the leader. That is, any autonomous vehicle 102 in the group 100 can be the leader, regardless of the position within the group 100 of the autonomous vehicles 102. Further, if an autonomous vehicle 102 is chosen as the leader that is not the first autonomous vehicle 102 in the group 100, in some embodiments, the newly chosen leader can proceed to the front of the group 100. Furthermore, any autonomous vehicle 102 in the group 100 can become the leader of the group 100.

In some embodiments, the group 100 may be homogenous in that all of the autonomous vehicles 102 are the same (e.g., the same make, model or type, owned by the same entity, etc.). Alternatively, the group 100 may be heterogeneous in that not all of the autonomous vehicles 102 in the group 100 are the same. In either case, any autonomous vehicle 102 in the group 100 can be the leader. Further, because it is not necessary for the leader to be the first autonomous vehicle 102 in the group 100, the leader can coordinate energy-saving measures for the group 100. For example, the leader can cause different ones of the autonomous vehicles 102 to be the first autonomous vehicle 102 in the group 100 so that the others of the autonomous vehicles 102 can draft behind the first autonomous vehicle 102 in the group 100. The leader can make this determination based on routing, power available, speed, types of vehicles, etc.

Additionally, the leader may select one or more of the autonomous vehicles 102 in the group 100 to serve a specific function for the group 100, reducing or eliminating the need for duplicative actions and thus preserving power and/or optimizing efficiency. For example, the leader may task one of the autonomous vehicles 102 to provide weather information to others of the autonomous vehicles 102 in the group 100 so that the other of the autonomous vehicles 102 are not required to monitor weather conditions. Further, the leader of the group 100 can change at any time. For example, a new leader can be selected if the current leader fails, malfunctions or experiences a problem, the current leader is no longer suited to be the leader (e.g., based on changed internal or external conditions, or if the current leader leaves the group 100.

While the discussion to this point has presumed that there is only a single leader for the group 100, this is not required. For example, the group 100 may have two or more leaders. In the case of two or more leaders, each of the leaders may be a leader (i.e., generally in command) of one or more aspects of the group 100. For example, a first leader may dictate the route (e.g., the autonomous vehicle 102 in the group 102 with location and route-planning capabilities best suited to the trip), while a second leader is in command of distribution of sensor information (e.g., the autonomous vehicle 102 in the group 100 with the greatest number of sensors, greatest variety of sensors, or sensors best suited for the trip). As other examples, a leader can be in command of propulsion, lighting, communications, power, navigation, or any other aspect of the group 100.

Further, while FIG. 1A depicts each autonomous vehicle 102 in the group 100 in a single file line, this is not required. For example, the autonomous vehicles 102 in the group can form multiple lines (e.g., across two lanes of a road) or a non-linear shape, such as a "V" shape. Additionally, the autonomous vehicles 102 in the group 100 can be unevenly spaced from one another. For example, some of the autonomous vehicles 102 can follow further from each other, the group 100 can be comprised of smaller subgroups of the autonomies vehicles 102 in which each subgroup is further from others of the subgroups, etc.

FIG. 1B depicts a larger group of autonomous vehicles 140 that is separating into smaller groups. As depicted in FIG. 1B, the larger group of autonomous vehicles 140 is separating into three smaller groups: a first group 152, a second group 154, and a third group 156. The first group 152 includes two autonomous vehicles: a first autonomous vehicle 142 and a second autonomous vehicle 144. The second group 154 includes one autonomous vehicle: a third autonomous vehicle 146. The third group 156 includes two autonomous vehicles: a fourth autonomous vehicle 148 and a fifth autonomous vehicle 150. The larger group of autonomous vehicles 140 may be separating in such a manner because the autonomous vehicles of each of the smaller groups may be travelling to similar destinations (e.g., a similar geographic region, the same city or destinations within a city, etc.).

In one embodiment, a negotiation may only occur when the current leader leaves the group. For example, if the fourth autonomous vehicle 148 was the leader of the larger group of autonomous vehicles 140, the autonomous vehicles of the third group 156 (i.e., the fourth autonomous vehicle 148 and the fifth autonomous vehicle 150) may not conduct a negotiation and the fourth autonomous 148 vehicle will be the leader of the third group 156. Accordingly, the autonomous vehicles of the first group 152 (i.e., the first autonomous vehicle 142 and the second autonomous vehicle 144) will conduct a negotiation to determine a leader and the autonomous vehicles of the second group 154 (i.e., the third autonomous vehicle 146) will conduct a negotiation to determine a leader, as the fourth autonomous vehicle 148 is no longer a part of the first group 152 or the second group 154.

In other embodiments, a negotiation may occur any time the members of a group change. For example, anytime a new autonomous vehicle joins the group, or one of the existing group members leaves the group, a negotiation occurs. In such an embodiment, the autonomous vehicles of the first group 152 (i.e., the first autonomous vehicle 142 and the second autonomous vehicle 144) would conduct a negotiation, the autonomous vehicles of the second group 154 (i.e., the third autonomous vehicle 146) would conduct a negotiation, and the autonomous vehicles of the third group 156 (i.e., the fourth autonomous vehicle 148 and the fifth autonomous vehicle 150) would conduct a negotiation.

Figure 2:
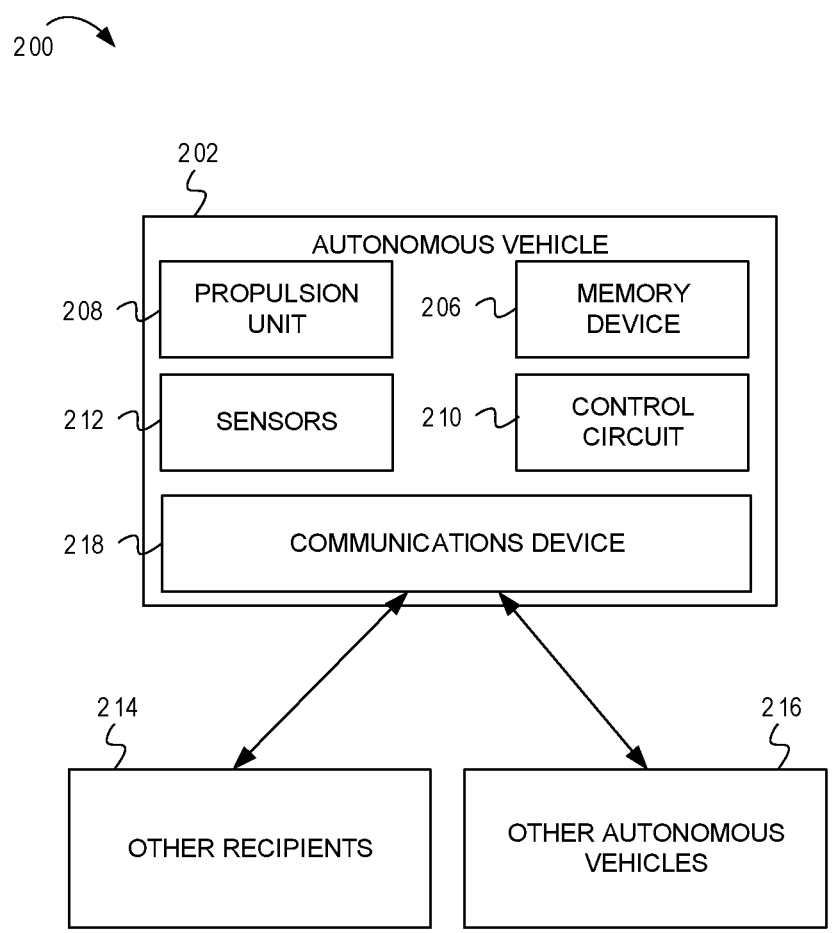
FIG. 2 is a block diagram of a system 200 including an example autonomous vehicle 202, according to some embodiments.

While the discussion of FIGS. 1A-1B provides general information about autonomous vehicles traveling as a group, the discussion of FIG. 2 provides information about an example autonomous vehicle that is capable of traveling in a group.

FIG. 2 is a block diagram of a system 200 including an example autonomous vehicle 202, according to some embodiments. The system 200 includes the autonomous vehicle 202, other autonomous vehicles 216, and other recipients 214.

The autonomous vehicle 202 communicates with the other autonomous vehicles 216 and the other recipients 214 via a communication device 218. The autonomous vehicle 202 communicates with the other autonomous vehicles 216 and the other recipients 214 to conduct a negotiation to determine a leader of a group of autonomous vehicles (e.g., a group including the autonomous vehicle 202 and the other autonomous vehicles 216). In some embodiments however, the autonomous vehicle may only communicate with one of the other recipients 214 and the other autonomous vehicles 216 to conduct this negotiation.

In addition to conducting the negotiation, the autonomous vehicle 202 can communicate with the other autonomous vehicles 216 regarding travel information, destination information, autonomous vehicle identities, autonomous vehicle power levels, environmental conditions, etc. The autonomous vehicle 202 can communicate with the other recipients 214 to receive other information that may be beyond the reach (physically or technically) of what the autonomous vehicle 202 can perceive. For example, the autonomous vehicle 202 can communicate with the other recipients 214 regarding weather, traffic patterns, a group goal, information regarding other autonomous vehicles, scheduling or route changes, etc. In some embodiments, the autonomous vehicles can communicate sensor data, communication data, etc. amongst one another. For example, a first of the autonomous vehicles may have weather sensors that are superior to those of any other autonomous vehicle in the group. The leader can direct the first of the autonomous vehicles to share weather data with others of the autonomous vehicles and instruct the others of the autonomous vehicles to utilize the received weather data. As another example, a second autonomous vehicle of the group of autonomous vehicles may have superior communications equipment (e.g., long-range antennas, satellite communication technology, etc.). The leader can task the second autonomous vehicle with communicating all intergroup communications (i.e., communications to participants and entities that are not in the group) and instruct all others of the autonomous vehicles to route intergroup communications through the second autonomous vehicle. In this way, the leader can assess the other autonomous vehicles in the group for task optimization and assignment In addition to the communication device 218, the autonomous vehicle 202 includes a propulsion unit 208, sensors 212, a memory device 206, and a control circuit 210. The control circuit 210 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 210 is configured (for example, by using corresponding programming as will be well understood by those skilled in the art) to carry out one or more of the steps, actions, and/or functions described herein.

By one optional approach the control circuit 210 operably couples to the memory device 206. The memory device 206 may be integral to the control circuit 210 or can be physically discrete (in whole or in part) from the control circuit 210 as desired. This memory device 206 can also be local with respect to the control circuit 210 (where, for example, both share a common circuit board, chassis, power supply, and/or housing) or can be partially or wholly remote with respect to the control circuit 210 (where, for example, the memory device 206 is physically located in another facility, metropolitan area, or even country as compared to the control circuit 210).

This memory device 206 can serve, for example, to non-transitorily store the computer instructions that, when executed by the control circuit 210, cause the control circuit 210 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The propulsion unit 208 can be of any type suitable to propel the autonomous vehicle 202. For example, the propulsion unit 208 can be any drivetrain coupled with a motor or engine. In the case of air-based or water-based autonomous vehicles, the propulsion unit 208 can be any suitable mechanism.

The autonomous vehicle 202 also includes sensors 212. The sensors 212 can include any number and type of sensors suitable for the autonomous vehicle 202. For example, the sensors 212 can include optical sensors, auditory sensors, locational sensors (e.g., suitable for a positioning device, such as a GPS unit), weather sensors (e.g., moisture sensors, humidity sensors, wind sensors, temperature sensors, etc.), haptic sensors, etc. The sensors 212 provide information to the autonomous vehicle regarding its surroundings and can allow the autonomous vehicle 202 to operate autonomously, follow other autonomous vehicles, etc.

Figure 3:
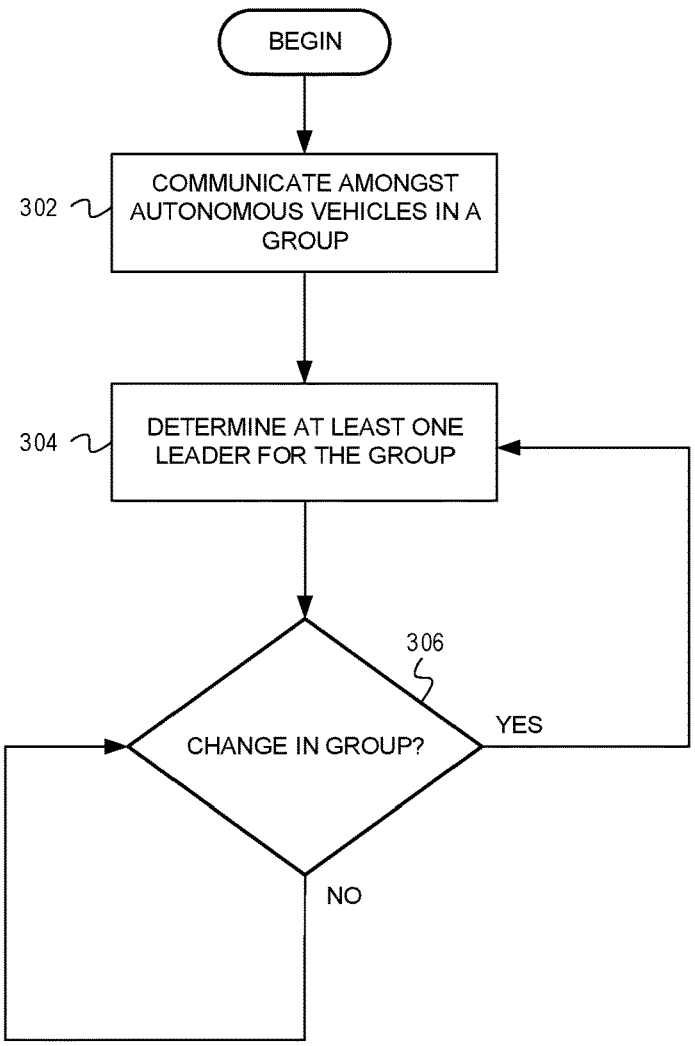
FIG. 3 is a flow chart depicting example operations for determining a leader for a group of autonomous vehicles, according to some embodiments.

While the discussion of FIG. 2 provides additional information about autonomous vehicles, the discussion of FIG. 3 describes example operations for conducting a negotiation to determine a leader of a group of autonomous vehicles.

FIG. 3 is a flow chart depicting example operations for determining a leader for a group of autonomous vehicles, according to some embodiments. The flow begins at block 302.

At block 302, autonomous vehicles in a group of autonomous vehicles communicate amongst each other. The autonomous vehicles can communicate information about destinations, cargo, capabilities, timing restrictions, power levels, external conditions, etc. In addition to communicating amongst each other, in some embodiments, one or more of the autonomous vehicles in the group may communicate with other recipients (e.g., non-autonomous vehicle recipients). The flow continues at block 304.

At block 304, at least one leader for the group of autonomous vehicles is determined. For example, the autonomous vehicles in the group of autonomous vehicles can conduct a negotiation to determine the one or more leaders of the group of autonomous vehicles. The at least one leader can be chosen based on qualities associated with each of the autonomous vehicles (e.g., types of sensors included on each autonomous vehicle), power level of each autonomous vehicle (fuel level, battery level, etc.), cargo of the autonomous vehicles, destinations of the autonomous vehicles, a collective goal of the first group, external factors (e.g., weather conditions, route conditions or type, etc.), position within the group (e.g., the first autonomous vehicle in the group), etc. The flow continues at decision diamond 306.

At decision diamond 306, it is determined whether there is a change in the group of autonomous vehicles. For example, an autonomous vehicle that is joining or leaving the group can inform the autonomous vehicles of the group of its intentions. In some embodiments, the current leader can authenticate autonomous vehicles that attempt to join the group. Additionally, or alternatively, other recipients can inform the group that one or more autonomous vehicles will be leaving or joining the group of autonomous vehicles. If it is determined that there has been a change in the group, the flow continues at block 304, where a new leader is determined. If there has not been a change in the group, in some embodiments, the flow continues at decision diamond 306 until there has been a change within the group.

While FIG. 3, and the associated text, describe a new leader being selected upon a change in a group of autonomous vehicles (e.g., an autonomous vehicle joins or leaves the group, a member of the group experiences a problem, etc.), other event can prompt a negotiation to occur and a new leader to be selected. For example, a new leader can be selected after a predetermined time, when external conditions (e.g., the weather, terrain, time of day, etc.) change, change in power level of one or more of the autonomous vehicles in the group, change in schedule or route, change in timing or priority, or after any other suitable event.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

In some embodiments, a system of autonomous vehicles comprises two or more autonomous vehicles each having a communication device and in communication with one another, each of the two or more autonomous vehicles including one or more sensors, the one or more sensors configured to detect information for use in self navigation of each of the two or more autonomous vehicles relative to others of the two or more autonomous vehicles, a propulsion unit, a communications device configured to communicate with others of the two or more autonomous vehicles, a control circuit, the control circuit configured to conduct a negotiation to establish at least one leader, wherein any of the two or more autonomous vehicles can become the at least one leader, wherein each of the one or more autonomous vehicles is configured to travel as a group, and receive and transport goods.

In some embodiments, an autonomous vehicle comprises one or more sensors, the one or more sensors configured to detect information for use in navigation by the autonomous vehicle relative to other autonomous vehicles, a propulsion unit, the propulsion unit configured to propel the autonomous vehicle, a communication device, the communication device configured to conduct a negotiation with other autonomous vehicles in a group of autonomous vehicles to determine at least one leader of the group of autonomous vehicles, wherein any autonomous vehicle in the group of autonomous vehicles can be the at least one leader.

What is claimed is:
1. A system comprising:
two or more autonomous vehicles each having a communication device and in communication with one another, each of the two or more autonomous vehicles including:
one or more sensors, the one or more sensors configured to detect information for use in self navigation of each of the two or more autonomous vehicles relative to others of the two or more autonomous vehicles;
a propulsion unit;
a communications device configured to communicate with others of the two or more autonomous vehicles; and
a control circuit, the control circuit configured to conduct a negotiation to establish at least one leader, wherein any of the two or more autonomous vehicles can become the at least one leader;
wherein each of the one or more autonomous vehicles is configured to:
travel as a group; and
receive and transport goods.
2. The system of claim 1, wherein at least some of the two or more autonomous vehicles are configured to leave the group.
3. The system of claim 2, wherein the operation to conduct a negotiation to establish at least one leader reoccurs after one or more of autonomous vehicles leave the group and autonomous vehicles join group.
4. The system of claim 1, wherein each of the two or more autonomous vehicles are further configured to:
share power with others of the two or more autonomous vehicles.
5. The system of claim 1, wherein each of the two or more autonomous vehicles are one of land-based autonomous vehicles, water-based autonomous vehicles, and aerial autonomous vehicles.
6. The system of claim 1, wherein each of the two or more autonomous vehicles are physically connected to at least one of the others of the two or more autonomous vehicles.
7. The system of claim 1, wherein the at least one leader is established based on one or more of a collective goal, a power supply, sensors associated with at least one of the two or more autonomous vehicles, a destination, and features of at least one of the one or more autonomous vehicles.
8. The system of claim 1, wherein the at least one leader includes two or more leaders, wherein each of the two or more leaders is a leader of an aspect of the group.
9. The system of claim 8, wherein the aspect includes one or more of sensors, navigation, propulsion, lighting, communications, power usage, and route-planning.

10. The system of claim 1, wherein the negotiation to establish the least one leader is based on communications between the two or more autonomous vehicles regarding capabilities of the two or more autonomous vehicles.

11. An autonomous vehicle, the autonomous vehicle comprising:
 one or more sensors, the one or more sensors configured to detect information for use in navigation by the autonomous vehicle relative to other autonomous vehicles;
 a propulsion unit, the propulsion unit configured to propel the autonomous vehicle;
 a communications device; and
 a control circuit communicatively coupled to the communications device, the control circuit configured to:
  conduct a negotiation with other autonomous vehicles in a group of autonomous vehicles to determine at least one leader of the group of autonomous vehicles, wherein any autonomous vehicle in the group of autonomous vehicles can be the at least one leader.

12. The autonomous vehicle of claim 11, wherein at least some of the autonomous vehicles in the group of autonomous vehicles is capable of leaving the group of autonomous vehicles.

13. The autonomous vehicle of claim 11, wherein the operation to conduct a negotiation occurs when at least one of the autonomous vehicles in the group of autonomous vehicles leaves the group.

14. The autonomous vehicle of claim 11, wherein the control circuit is further configured to:
 conduct a negotiation with the autonomous vehicles in the group of autonomous vehicles to share power between the autonomous vehicles in the group of autonomous vehicles.

15. The autonomous vehicle of claim 11, wherein the autonomous vehicle is one of a land-based autonomous vehicle, a water-based autonomous vehicle, and an aerial autonomous vehicle.

16. The autonomous vehicle of claim 11, further comprising:
 a connection mechanism, the connection mechanism configured to secure the autonomous vehicle to at least on other autonomous vehicle.

17. The autonomous vehicle of claim 11, wherein the at least one leader is established based on one or more of a collective goal, a power supply, sensors associated with at least one of the autonomous vehicles in the group of autonomous vehicles, a destination, and features of at least one of the one or more autonomous vehicles.

18. The autonomous vehicle of claim 11, wherein the at least one leader includes two or more leaders, wherein each of the two or more leaders is a leader of an aspect of the group of autonomous vehicles.

19. The autonomous vehicle of claim 18, wherein the aspect includes one or more of sensors, navigation, propulsion, lighting, communications, power usage, and route-planning.

20. The autonomous vehicle of claim 11, wherein the negotiation with other autonomous vehicles in the group of autonomous vehicles to determine the least one leader of the group of autonomous vehicles is based on communications with the other autonomous vehicles in the group of autonomous vehicles regarding capabilities of the other autonomous vehicles in the group of autonomous vehicles.

* * * * *